(12) United States Patent
Venkataswamy et al.

(10) Patent No.: US 11,591,468 B2
(45) Date of Patent: Feb. 28, 2023

(54) DAMPING THERMOPLASTIC ELASTOMER BLENDS EXHIBITING CLARITY

(71) Applicant: PolyOne Corporation, Avon Lake, OH (US)

(72) Inventors: Krishna Venkataswamy, Crystal Lake, IL (US); Jiren Gu, Crystal Lake, IL (US)

(73) Assignee: Avient Corporation, Avon Lake, OH (US)

( * ) Notice: Subject to any disclaimer, the term of this patent is extended or adjusted under 35 U.S.C. 154(b) by 15 days.

(21) Appl. No.: 16/606,071

(22) PCT Filed: Apr. 24, 2018

(86) PCT No.: PCT/US2018/029123
§ 371 (c)(1),
(2) Date: Oct. 17, 2019

(87) PCT Pub. No.: WO2018/200510
PCT Pub. Date: Nov. 1, 2018

(65) Prior Publication Data
US 2020/0040182 A1    Feb. 6, 2020

Related U.S. Application Data

(60) Provisional application No. 62/491,844, filed on Apr. 28, 2017.

(51) Int. Cl.
| | | |
|---|---|---|
| C08L 75/06 | (2006.01) | |
| C08L 53/02 | (2006.01) | |
| B29C 45/00 | (2006.01) | |
| C08K 5/00 | (2006.01) | |
| C08K 5/01 | (2006.01) | |

(52) U.S. Cl.
CPC ............... *C08L 75/06* (2013.01); *C08L 53/02* (2013.01); *B29C 45/0001* (2013.01); *C08K 5/005* (2013.01); *C08K 5/01* (2013.01); *C08L 2201/08* (2013.01); *C08L 2207/04* (2013.01)

(58) Field of Classification Search
CPC .......... C08L 75/06; C08L 53/00; C08L 53/02; C08L 2201/08; C08L 2207/04; C08K 5/01; C08K 5/005; B29C 45/0001
See application file for complete search history.

(56) References Cited

U.S. PATENT DOCUMENTS

| | | |
|---|---|---|
| 9,023,918 B1 | 5/2015 | Mistry et al. |
| 2009/0087607 A1 | 3/2009 | Noda et al. |
| 2010/0160545 A1 | 6/2010 | Page |
| 2015/0306845 A1 | 10/2015 | Dollase et al. |
| 2016/0230000 A1 | 8/2016 | Gu |
| 2016/0355706 A1 | 12/2016 | Dollase et al. |

FOREIGN PATENT DOCUMENTS

| | | |
|---|---|---|
| JP | 2005187721 A | 7/2005 |
| JP | 2016505412 A | 2/2016 |
| WO | 2016130627 A1 | 8/2016 |
| WO | 2016130630 A1 | 8/2016 |
| WO | 2016130631 A1 | 8/2016 |
| WO | 2016130639 A1 | 8/2016 |

OTHER PUBLICATIONS

Huntsman Corporation: "Elastomers A guide to thermoplastic polyurethanes (TPU)," 2010, 26 pages.

*Primary Examiner* — Angela C Scott
(74) *Attorney, Agent, or Firm* — David V. Monateri; Emily E. Vlasek; Michael J. Sambrook

(57) ABSTRACT

A thermoplastic elastomer compound includes polyester-type thermoplastic polyurethane and no greater than about 30 weight percent of styrene-isobutylene-styrene block copolymer. The compound has good clarity, as exhibited by a haze of no greater than about 60%, or 50%, or 30%, according to ASTM D 1003. Additionally, the compound has good damping properties, as exhibited by a resilience or vertical rebound of less than about 25% according to ASTM D2632.

11 Claims, No Drawings

DAMPING THERMOPLASTIC ELASTOMER BLENDS EXHIBITING CLARITY

CLAIM OF PRIORITY

This application claims the benefit of U.S. Provisional Patent Application Ser. No. 62/491,844 filed on Apr. 28, 2017, which is hereby incorporated by reference in its entirety.

FIELD OF THE INVENTION

This invention relates to damping thermoplastic elastomer compounds which exhibit good clarity. More particularly, this invention relates to blends of thermoplastic elastomers of different chemistries, which as blends exhibit good clarity while also having useful damping properties.

BACKGROUND OF THE INVENTION

Demand exists in a variety of applications for materials that exhibit damping properties. In general, damping is the dissipation of mechanical energy from a system.

Thermoplastic elastomers (TPE), which are polymer materials that exhibit elasticity while remaining thermoplastic, can be used for damping applications. Thermoplastic elastomers can include styrenic block copolymers (SBC), thermoplastic vulcanizates (TPV), thermoplastic olefins (TPO), copolyesters (COPE), thermoplastic polyurethanes (TPU), copolyamides (COPA), and olefinic block copolymer (OBC).

Applications in which damping is important include protective cases and other accessories for personal electronic devices such as smart phones, tablets, and handheld computers.

Protective cases for personal electronic devices also typically require good aesthetics such as "look" and "feel" that are desirable to consumers. For example, some consumers prefer the look of protective cases that are relatively clear in appearance. Further, some consumers prefer the feel of protective cases that are relative soft to the touch.

Thermoplastic polyurethanes (TPU) are a class of TPEs that can be useful for making protective cases for personal electronic devices. Typically, TPUs can provide good abrasion resistance and good chemical resistance. Also, many available grades of TPUs are transparent. However, as compared to other types of TPEs, TPUs can be relatively harder and can have relatively lower damping properties. Therefore, there is need for improvement of the properties of TPUs when they are used for applications such as protective cases for personal electronic devices.

Styrenic block copolymers (SBC) are another class of TPEs. Certain SBCs can be useful in TPE compounds which exhibit improved damping properties, as described in commonly assigned published applications WO 2016/130639A1; W0 2016/130631A1; WO 2016/130630A1; WO 2016/130627A1; and US 2016/0230000; each of which is hereby incorporated by reference in its entirety. However, blending certain SBCs with certain TPUs with an aim to improve the damping properties of the TPUs can actually decrease clarity of the TPUs.

SUMMARY OF THE INVENTION

Consequently, a need exists for thermoplastic elastomer compounds that have improved damping properties while also having good clarity.

The aforementioned needs are met by one or more aspects of the present invention.

Surprisingly, it has been found that, by adding no greater than about 30 weight percent of styrene-isobutylene-styrene block copolymer to a polyester-type thermoplastic polyurethane, it is possible to provide a thermoplastic elastomer compound having improved damping properties relative to the polyester-type thermoplastic polyurethane alone while also having good clarity that can be comparable to the clarity of the polyester-type thermoplastic polyurethane alone.

One aspect of the invention is a thermoplastic elastomer compound that includes polyester-type thermoplastic polyurethane and no greater than about 30 weight percent of styrene-isobutylene-styrene block copolymer. The compound has good clarity, as exhibited by a haze of no greater than about 60%, or 50%, or 30%, when the compound is injection molded and tested at a thickness of 3 mm according to ASTM D1003. Additionally, the compound has good damping properties, as exhibited by a resilience or vertical rebound of less than about 25% when injection molded and tested at a thickness of 3 mm according to ASTM D2632.

Another aspect of the invention is a plastic article formed from the aforementioned thermoplastic elastomer compound.

Features of the invention will become apparent with reference to the following embodiments. There exist various refinements of the features noted in relation to the above-mentioned aspects of the present invention. Additional features may also be incorporated in the above-mentioned aspects of the present invention. These refinements and additional features may exist individually or in any combination. For instance, various features discussed below in relation to any of the described aspects of the present invention may be incorporated into any of the described aspects of the present invention alone or in any combination.

EMBODIMENTS OF THE INVENTION

In some embodiments, the present invention is directed to a thermoplastic elastomer compound that includes polyester-type thermoplastic polyurethane and no greater than about 30 weight percent of styrene-isobutylene-styrene block copolymer. In other embodiments, the present invention is directed to a plastic article formed from the aforementioned thermoplastic elastomer compound. Required and optional features of these and other embodiments of the present invention are described.

As used herein, the term "essentially free of" a certain component means, in some embodiments, that no amount of that component is intentionally incorporated into a compound. In other embodiments, it means that less than 0.01 weight percent of the component is intentionally incorporated into the compound; and, in other embodiments, it means that less than 0.001 weight percent of the component is intentionally incorporated into the compound.

Thermoplastic Elastomer Compound

In some embodiments, the present invention is directed to a thermoplastic elastomer compound that includes polyester-type thermoplastic polyurethane and no greater than about 30 weight percent of styrene-isobutylene-styrene block copolymer.

The thermoplastic elastomer compound of the present invention has good clarity as exhibited by a measurement of percent haze when the compound is injection molded and tested at a thickness of 3 mm according to ASTM D1003. In some embodiments, the compound has a haze of no greater than about 60%. In other embodiments, the compound has a haze of no greater than about 50%, for example, ranging from about 20% to about 50%. In further embodiments, the compound has a haze of no greater than about 30%, for example, ranging from about 20% to about 30%. In even further embodiments, the compound has clarity that is substantially comparable to the clarity of the polyester-type thermoplastic polyurethane alone (i.e., neat).

The thermoplastic elastomer compound of the present invention also has improved damping properties relative to the polyester-type thermoplastic polyurethane alone (i.e., neat), as exhibited by a measurement of resilience or vertical rebound when injection molded and tested at a thickness of 3 mm according to ASTM D2632. To measure resilience or vertical rebound, a SHORE Model SRI Resiliometer, commonly referred to as a Bayshore Resiliometer, can be used. In some embodiments, the compound has a vertical rebound of less than about 25%.

The thermoplastic elastomer compound of the present invention additionally has reduced hardness (i.e., improved softness) relative to the polyester-type thermoplastic polyurethane alone (i.e., neat), as exhibited by a measurement of Shore A hardness when tested with a 10 second delay according to ASTM D2240. In some embodiments, the compound has a Shore A hardness of less than about 83. In other embodiments, the compound has a Shore A hardness of less than about 80.

Polyester-Type Thermoplastic Polyurethane

Thermoplastic elastomer compounds of the present invention include one or more polyester-type thermoplastic polyurethanes.

As used here, a "polyester-type thermoplastic polyurethane" means a type of thermoplastic polyurethane that is a reaction product of reactants including polyester polyol and diisocyanate and, optionally, chain extender.

In general, thermoplastic polyurethanes are composed of hard segments and soft segments. The soft segments in polyester-type thermoplastic polyurethanes are polyester-based segments.

Polyester-type thermoplastic polyurethanes suitable for use in the present invention include any available polyester-type thermoplastic polyurethanes.

Examples of commercially available polyester-type thermoplastic polyurethanes include those available under the ELASTOLLAN brand from BASF, such as ELASTOLLAN S85A55N polyester-type thermoplastic polyurethane, and those available under the AVALON brand from Huntsman, such as AVALON S85 ABU polyester-type thermoplastic polyurethane.

In contrast to suitable polyester-type thermoplastic polyurethanes, polyether-type thermoplastic polyurethanes are not suitable for use in the present invention. Polyether-type thermoplastic polyurethane is a type of thermoplastic polyurethane that is a reaction product of reactants including polyether polyol and diisocyanate and, optionally, chain extender. That is, the soft segments in polyether-type thermoplastic polyurethanes are polyether-based segments.

Surprisingly, it has been found that it is possible to achieve better clarity (i.e., lower haze) by using polyester-type thermoplastic polyurethane in blends with styrene-isobutylene-styrene block copolymer according to the present invention, as compared to the clarity achieved by using polyether-type thermoplastic polyurethane in blends with the same amount of styrene-isobutylene-styrene block copolymer. Indeed, in some embodiments of the present invention, it is possible to achieve clarity that is more than twice as good (i.e., haze that is less than half) as that achieved by using polyether-type thermoplastic polyurethane.

Accordingly, in preferred embodiments of the present invention, the compound is essentially free of polyether-type polyurethane.

Styrene-Isobutylene-Styrene Block Copolymer

Thermoplastic elastomer compounds of the present invention include no greater than about 30 weight percent of one or more styrene-isobutylene-styrene block copolymer.

Styrene-isobutylene-styrene block copolymers that are suitable for use in the present invention include any available styrene-isobutylene-styrene block copolymer.

Examples of commercially available styrene-isobutylene-styrene block copolymers include those available under the SIB STAR brand from Kaneka, such as SIBSTAR 103T-F styrene-isobutylene-styrene block copolymer.

Optional Additives

In some embodiments, the thermoplastic elastomer compound further includes one or more conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (elsevier.com), can select from many different types of additives for inclusion into the compounds of the present invention.

Non-limiting examples of optional additives that can be included in the thermoplastic elastomer compounds of the present invention include adhesion promoters; biocides; anti-fogging agents; anti-static agents; blowing and foaming agents; bonding agents and bonding polymers; dispersants; flame retardants and smoke suppressants; impact modifiers; initiators; lubricants; micas; pigments, colorants and dyes; processing aids; release agents; silanes, titanates and zirconates; slip and anti-blocking agents; stabilizers; stearates; ultraviolet light absorbers; viscosity regulators; waxes; and combinations of any of the aforementioned additives.

Ranges of Ingredients in the TPE Compounds

Table 1 below shows the acceptable, desirable, and preferable ranges of ingredients for the thermoplastic elastomer compound of the present invention, based on parts by weight included in the thermoplastic elastomer compound.

The thermoplastic elastomer compound of the present invention can comprise, consist essentially of, or consist of these ingredients. Any number between the ends of the ranges is also contemplated as an end of a range, such that all possible combinations are contemplated within the possibilities of Table 1 as embodiments of the present invention. Unless expressly stated otherwise herein, any disclosed number is intended to refer to "about" the disclosed number.

TABLE 1

| Thermoplastic Elastomer Compounds (parts by weight) | | | |
|---|---|---|---|
| Ingredient | Acceptable | Desirable | Preferable |
| Polyester-Type Thermoplastic Polyurethane | 70 to 95 | 75 to 90 | 80 to 90 |
| Styrene-Isobutylene-Styrene Block Copolymer | 5 to 30 | 10 to 25 | 10 to 20 |
| Optional Additives | 0 to 1 | 0 to 0.6 | 0 to 0.3 |

For example, in some embodiments, the thermoplastic elastomer compound of the present invention includes (a) from about 74.5 to about 94.9 weight percent, by weight of the compound, of polyester-type thermoplastic polyurethane; (b) from about 5 to about 25 weight percent, by weight of the compound, of styrene-isobutylene-styrene block copolymer; and (c) from about 0.1 to about 0.5 weight percent, by weight of the compound, of one or more additives such as additives selected from antioxidants, waxes, and combinations thereof.

In other embodiments, the styrene-isobutylene-styrene block copolymer is present in thermoplastic elastomer compounds of the present invention in an amount ranging from about 10 to about 20 weight percent, by weight of the compound.

In further embodiments, the polyester-type thermoplastic polyurethane is present in thermoplastic elastomer compounds of the present invention in an amount ranging from about 80 to about 90 weight percent, by weight of the compound.

Inclusion of additional ingredients can have a negative impact on the clarity of the resulting thermoplastic elastomer compound.

Accordingly, in some embodiments, the thermoplastic elastomer compound of the present invention is essentially free of styrenic block copolymer selected from styrene-ethylene/butylene-styrene block copolymer (SEBS), styrene-ethylene/propylene-styrene block copolymer (SEPS), styrene-ethylene/ethylene/propylene-styrene block copolymer (SEEPS), styrene-butadiene-styrene block copolymer (SBS), styrene-isoprene-styrene block copolymer (SIS), and combinations thereof.

Likewise, in some embodiments, the thermoplastic elastomer compound of the present invention is essentially free of high softening point tackifier.

Processing

The preparation of thermoplastic elastomer compounds of the present invention is uncomplicated once the proper ingredients have been selected. The compound of the present can be made in batch or continuous operations.

Mixing in a continuous process typically occurs in an extruder that is elevated to a temperature that is sufficient to melt the polymer matrix with addition of all additives at the feed-throat, or by injection or side-feeders downstream. Extruder speeds can range from about 200 to about 700 revolutions per minute (rpm), and preferably from about 300 rpm to about 500 rpm. Typically, the output from the extruder is pelletized for later extrusion, molding, thermoforming, foaming, calendering, and/or other processing into polymeric articles.

Subsequent extrusion, molding, thermoforming, foaming, calendering, and/or other processing techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.elsevier.com), one can make articles of any conceivable shape and appearance using compounds of the present invention.

USEFULNESS OF THE INVENTION

As described above, thermoplastic elastomer compounds of the present invention have improved damping properties relative to polyester-type thermoplastic polyurethane alone while also having good clarity that can be comparable to the clarity of the polyester-type thermoplastic polyurethane alone.

Accordingly, thermoplastic elastomer compounds of the present invention can be used for any plastic article or any component of a multi-component plastic article or portion of a multi-portion plastic article which needs physical properties of a TPE, such as flexibility, elongation, and/or a soft or silky feel, while also advantageously providing improved damping properties and good clarity.

In addition to being useful for protective cases and other accessories for personal electronic devices such as smart phones, tablets, handheld computers, and the like, thermoplastic elastomer compounds of the present invention have potential for use in applications in many different industries, including but not limited to: acoustics; automotive and transportation; communications; consumer products; electronics; healthcare and medical; household appliances; industrial equipment; personal safety; security; sports protection; and other industries or applications benefiting from the compound's unique combination of properties.

In some embodiments, the present invention is directed to a plastic article formed from the thermoplastic elastomer compound as described herein.

In some embodiments, plastic articles of the present invention can be formed from the thermoplastic elastomer compound as described herein by molding, extruding, thermoforming, laminating, calendering, and additive 3-D printing.

EXAMPLES

Non-limiting examples of thermoplastic elastomer compounds of various embodiments of the present invention are provided.

Table 2 below shows sources of ingredients for the thermoplastic elastomer compounds of Comparative Examples A to G and Examples 1 to 4.

TABLE 2

| Ingredient | Brand | Source |
|---|---|---|
| Polyester-type thermoplastic polyurethane (ester TPU) | ELASTOLLAN S85A55N | BASF |
| Polyester-type thermoplastic polyurethane (ester TPU) | AVALON S85 ABU | Huntsman |
| Polyether-type thermoplastic polyurethane (ether TPU) | IROGRAN A85 P 4394 UV | Huntsman |
| Styrene-isobutylene-styrene block copolymer (SIBS) | SIBSTAR T103 | Kaneka |
| Wax | KEMAMIDE B | PMC |
| Antioxidant | IRGANOX 1010 | BASF |
| Antioxidant | IRGAFOS 168 | BASF |

Table 3 below shows the formulations and certain properties of Comparative Examples A to G and Examples 1 to 4.

TABLE 3

| | Example | | | | | |
|---|---|---|---|---|---|---|
| | A | | 1 | | 2 | |
| | Wt. Parts | Wt. % | Wt. Parts | Wt. % | Wt. Parts | Wt. % |
| Ingredient | | | | | | |
| ELASTOLLAN S85A55N (Polyester-type TPU) | 100 | 99.7 | 90 | 89.7 | 80 | 79.8 |
| AVALON S85 ABU | — | — | — | — | — | — |

TABLE 3-continued

| | Example | | | | | |
|---|---|---|---|---|---|---|
| | | | | | | |
| | Wt. Parts | Wt. % | Wt. Parts | Wt. % | Wt. Parts | Wt. % |
| (Polyester-type TPU) | | | | | | |
| IROGRAN A85 P 4394 UV (Polyether-type TPU) | — | — | — | — | — | — |
| SIBSTAR 103T-F | — | — | 10 | 10.0 | 20 | 19.9 |
| KENAMIDE B | 0.1 | 0.1 | 0.1 | 0.1 | 0.1 | 0.1 |
| IRGANOX 1010 | 0.1 | 0.1 | 0.1 | 0.1 | 0.1 | 0.1 |
| IRGAFOS 168 | 0.1 | 0.1 | 0.1 | 0.1 | 0.1 | 0.1 |
| TOTAL | 100.3 | 100.0 | 100 | 100.0 | 100.3 | 100.0 |
| Properties | | | | | | |
| Hardness (Shore A) (ASTM D2240, 10 sec delay) | | 83 | | 82 | | 79 |
| Haze (%) (ASTM D1003) | | 24 | | 29 | | 41 |
| Vertical Rebound (%) (ASTM D2632) | | 26 | | 22 | | 19 |

| | Example | | | | | |
|---|---|---|---|---|---|---|
| | 3 | | B | | C | |
| | Wt. Parts | Wt. % | Wt. Parts | Wt. % | Wt. Parts | Wt. % |
| Ingredients | | | | | | |
| ELASTOLLAN S85A55N (Polyester-type TPU) | 70 | 69.8 | 60 | 59.8 | 50 | 49.9 |
| AVALON S85 ABU (Polyester-type TPU) | — | — | — | — | — | — |
| IROGRAN A85 P 4394 UV (Polyether-type TPU) | — | — | — | — | — | — |
| SIBSTAR 103T-F | 30 | 29.9 | 40 | 39.9 | 50 | 49.9 |
| KENAMIDE B | 0.1 | 0.1 | 0.1 | 0.1 | 0.1 | 0.1 |
| IRGANOX 1010 | 0.1 | 0.1 | 0.1 | 0.1 | 0.1 | 0.1 |
| IRGAFOS 168 | 0.1 | 0.1 | 0.1 | 0.1 | 0.1 | 0.1 |
| TOTAL | 100.3 | 100.0 | 100.3 | 100.0 | 100.3 | 100.0 |
| Properties | | | | | | |
| Hardness (Shore A) (ASTM D2240, 10 sec delay) | | 79 | | 72 | | 69 |
| Haze (%) (ASTM D1003) | | 57 | | 70 | | 83 |
| Vertical Rebound (%) (ASTM D2632) | | 17 | | 15 | | 12 |

| | Example | | | | | |
|---|---|---|---|---|---|---|
| | 4 | | D | | E | |
| | Wt. Parts | Wt. % | Wt. Parts | Wt. % | Wt. Parts | Wt. % |
| Ingredients | | | | | | |
| ELASTOLLAN S85A55N (Polyester-type TPU) | — | — | — | — | — | — |
| AVALON S85 ABU (Polyester-type TPU) | 85 | 84.7 | — | — | — | — |
| IROGRAN A85 P 4394 UV (Polyether-type TPU) | — | — | 85 | 84.7 | 70 | 69.8 |
| SIBSTAR 103T-F | 15 | 15.0 | 15 | 15.0 | 30 | 29.9 |
| KENAMIDE B | 0.1 | 0.1 | 0.1 | 0.1 | 0.1 | 0.1 |
| IRGANOX 1010 | 0.1 | 0.1 | 0.1 | 0.1 | 0.1 | 0.1 |
| IRGAFOS 168 | 0.1 | 0.1 | 0.1 | 0.1 | 0.1 | 0.1 |
| TOTAL | 100.3 | 100.0 | 100.3 | 100.0 | 100.3 | 100.0 |
| Properties | | | | | | |
| Hardness (Shore A) (ASTM D2240, 10 sec delay) | | 78 | | 79 | | 75 |
| Haze (%) (ASTM D1003) | | 22 | | 50 | | 61 |
| Vertical Rebound (%) (ASTM D2632) | | 22 | | 26 | | 20 |

| | Example | | | |
|---|---|---|---|---|
| | F | | G | |
| | Wt. Parts | Wt. % | Wt. Parts | Wt. % |
| Ingredients | | | | |
| ELASTOLLAN S85A55N (Polyester-type TPU) | 100 | 100.0 | — | — |
| AVALON S85 ABU (Polyester-type TPU) | — | — | 100 | 100.0 |
| IROGRAN A85 P 4394 UV (Polyether-type TPU) | — | — | — | — |
| SIBSTAR 103T-F | — | — | — | — |
| KENAMIDE B | — | — | — | — |
| IRGANOX 1010 | — | — | — | — |
| IRGAFOS 168 | — | — | — | — |
| TOTAL | 100 | 100.0 | 100 | 100.0 |
| Properties | | | | |
| Hardness (Shore A) (ASTM D2240, 10 sec delay) | | 83 | | 83 |
| Haze (%) (ASTM D1003) | | 18 | | 18 |
| Vertical Rebound (%) (ASTM D2632) | | 26 | | 31 |

The Examples in Table 3 were prepared by compounding the ingredients altogether using a twin screw extruder at a mixing temperature of 180° C. and a mixing speed of 300 rpm to provide extruded pellets (except that the Comparative Examples which are neat TPU resins were not compounded). For each Example, pellets were injection molded into plaques having a thickness of 3 mm, which were used for testing the reported properties.

Comparison of Comparative Examples A, F, and G with Examples 1 to 3 demonstrates that as the amount of SIBS is increased, vertical rebound (i.e., damping properties) and hardness (i.e., softness) are improved while haze (i.e., clarity) remains within an acceptable range.

Further comparison of Example 1 to 3 with Comparative Examples B and C demonstrates that haze (i.e., clarity) becomes unacceptable when the amount of SIBS is increased beyond about 30 weight percent.

Surprisingly, comparison of Example 4 with Comparative Example D demonstrates that, even when the amount of SIBS is the same in a TPU/SIBS blend, it is possible to achieve significantly lower haze (i.e., better clarity) by using polyester-type TPU rather than polyether-type TPU. Example 4, which includes about 85 weight percent of polyester-type TPU and about 15 weight percent of SIBS, has a haze of 22%. In direct contrast, Comparative Example D, which includes about 85 weight percent of polyether-type TPU and about 15 weight percent of SIBS, has a haze of 50%. Thus, unexpectedly, by using polyester-type TPU, it is possible to achieve clarity that is more than twice as good (i.e., haze that is less than half) as that achieved by using polyether-type thermoplastic polyurethane.

Without undue experimentation, those having ordinary skill in the art can utilize the written description of the present invention, including the Examples, to formulate thermoplastic elastomer compounds that have improved damping properties while also having good clarity.

All documents cited in the Embodiments of the Invention are, in relevant part, incorporated herein by reference. The citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of the present invention.

What is claimed is:

1. A thermoplastic elastomer compound comprising:
   (a) about 70 weight percent or more and no greater than about 90 weight percent, by weight of the compound, of polyester-type thermoplastic polyurethane; and
   (b) about 10 weight percent or more and no greater than about 30 weight percent, by weight of the compound, of styrene-isobutylene-styrene block copolymer;
   wherein the compound has a haze of no greater than about 60% when injection molded and tested at a thickness of 3 mm according to ASTM D1003,
   wherein the compound has a vertical rebound of less than about 25% when injection molded and tested at a thickness of 3 mm according to ASTM D2632, and
   wherein the compound is essentially free of styrenic block copolymer selected from the group consisting of styrene-ethylene/butylene-styrene block copolymer (SEBS), styrene-ethylene/propylene-styrene block copolymer (SEPS), styrene-ethylene/ethylene/propylene-styrene block copolymer (SEEPS), styrene-butadiene-styrene block copolymer (SBS), styrene-isoprene-styrene block copolymer (SIS), and combinations thereof.

2. The compound of claim 1, wherein the compound has a haze ranging from about 20% to about 30% when injection molded and tested at a thickness of 3 mm according to ASTM D1003.

3. The compound of claim 1, wherein the compound has a Shore A hardness of less than about 83 when tested with a 10 second delay according to ASTM D2240.

4. The compound of claim 1, wherein the compound further comprises at least one additive selected from the group consisting of adhesion promoters; antioxidants; biocides; anti-fogging agents; anti-static agents; blowing and foaming agents; bonding agents and bonding polymers; dispersants; flame retardants and smoke suppressants; impact modifiers; initiators; lubricants; micas; pigments, colorants and dyes; plasticizers, processing aids; release agents; silanes, titanates and zirconates; slip and anti-blocking agents; stabilizers; stearates; ultraviolet light absorbers; viscosity regulators; waxes; and combinations thereof.

5. The compound of claim 1, wherein the compound comprises:
   (a) from about 80 to about 90 weight percent, by weight of the compound, of polyester-type thermoplastic polyurethane;
   (b) from about 10 to about 20 weight percent, by weight of the compound, of styrene-isobutylene-styrene block copolymer; and
   (c) from about 0.1 to about 0.5 weight percent, by weight of the compound, of one or more additives selected from the group consisting of antioxidants, waxes, and combinations thereof.

6. The compound of claim 1, wherein the polyester-type thermoplastic polyurethane is a reaction product of reactants comprising polyester polyol and diisocyanate and, optionally, chain extender.

7. The compound of claim 1, wherein the compound is essentially free of polyether-type polyurethane.

8. The compound of claim 1, wherein the compound is essentially free of high softening point tackifier.

9. The compound of claim 1, wherein the compound consists of:
   (a) from about 80 to about 90 weight percent, by weight of the compound, of polyester-type thermoplastic polyurethane;
   (b) from about 10 to about 20 weight percent, by weight of the compound, of styrene-isobutylene-styrene block copolymer; and
   (c) from about 0.1 to about 0.5 weight percent, by weight of the compound, of one or more additives selected from the group consisting of antioxidants, waxes, and combinations thereof.

10. A plastic article formed from the compound of claim 1.

11. The article of claim 10, wherein the article is a molded article, an extruded article, a thermoformed article, a laminated article, a calendered article, or an additive 3-D printed article.

* * * * *